United States Patent [19]

Greene et al.

[11] 4,358,947

[45] Nov. 16, 1982

[54] METHOD AND APPARATUS FOR VOLUMETRIC CALIBRATION OF LIQUID FLOW SENSOR OUTPUT SIGNALS

[75] Inventors: Edward S. Greene, Allen Park; Eric M. Knight, Inkster, both of Mich.

[73] Assignee: Ford Motor Company, Dearborn, Mich.

[21] Appl. No.: 219,123

[22] Filed: Dec. 22, 1980

[51] Int. Cl.³ .............................................. G01L 25/00
[52] U.S. Cl. ......................................................... 73/3
[58] Field of Search ............................. 73/3, 113, 114

[56] References Cited

U.S. PATENT DOCUMENTS

| | | | |
|---|---|---|---|
| 3,177,699 | 4/1965 | Lindquist et al. | 73/3 |
| 3,888,106 | 6/1975 | Last | 73/3 |
| 4,217,644 | 8/1980 | Kato | 73/113 |

Primary Examiner—S. Clement Swisher
Attorney, Agent, or Firm—Paul K. Godwin, Jr.; Clifford L. Sadler

[57] ABSTRACT

A liquid flow sensor produces output signals which are monitored over a known volume of flowing liquid. That monitored signal value is scaled according to a predetermined volume of liquid to provide a correction factor, whereby the output signal of the flow sensor is continually corrected to provide an expected number of flow sensor pulses per unit volume.

9 Claims, 2 Drawing Figures

METHOD AND APPARATUS FOR VOLUMETRIC CALIBRATION OF LIQUID FLOW SENSOR OUTPUT SIGNALS

BACKGROUND OF THE INVENTION

1. Field of the Invention

The present invention is directed to the field of volumetric flow measurement and more specifically to the area of overcoming errors inherent in flow sensor devices.

2. Description of the Prior Art

Many devices have been disclosed in the prior art that are alleged to accurately monitor liquid flow in a tube or pipe.

Turbine devices, such as those disclosed in U.S. Pat. Nos. 3,135,116; 3,867,840; and 4,011,757; each utilize rotating blades of a turbine to interrupt a light path from a source to a detector so that pulses are produced which are directly related to the speed of the rotating turbine and correspond to the flow of liquid through the device.

Other types of flow sensors, such as those disclosed in U.S. Pat. Nos. 4,012,949; 4,212,195; and 4,212,200, utilize dynamic force of the flowing liquid to effect electrical changes that may be measured to determine flow rates.

Still other types of fluid flow sensors, such as those disclosed in U.S. Pat. Nos. 2,776,568 and 4,050,295 utilize rotating balls in a closed flow track that are individually forced past a sensing element to represent a unit of flowing liquid.

While each of the fluid flow sensors of the prior art have distinct advantages and disadvantages with respect to each other, they each have a common disadvantage in that when located in various climatic regions where environmental temperatures are comparatively extreme, errors exist between devices of a like kind. It has been found that large errors in the number of pulses per unit of flowing liquid is not uncommon in existing flow sensors when subjected to extreme temperatures in flowing fluids. Similarly, errors in output develop as flow sensors age.

When such units are employed in liquid consumption measuring systems that utilize electrical components with comparatively low error tolerances, the potential for flow sensor errors exists for the output information to be inaccurate and unreliable.

SUMMARY OF THE INVENTION

High accuracy and repeatability between replaced flow sensors is a basic criteria in the automotive, aviation and marine industries where the flow sensors are employed to measure fuel consumption. Fuel consumption measurements are used, along with measurements from other sensors, by associated circuitry to calculate such information as: average and instantaneous fuel quantity consummed per unit of time; average and instantaneous fuel quantity consumed per unit of distance; and predicted cruising range.

Therefore, the present invention is intended to overcome the inherent inaccuracies of prior art fluid flow sensors by providing both method and apparatus for calibrating flow sensor output signals according to a volumetric reference. The volumetric reference is obtained from a liquid level sensor at an initial measured level value of liquid within an associated storage tank and a second level value of liquid that is measured after a predetermined volume of liquid is added to the storage tank. The two measured values are stored to define a calibration range for monitoring the output of the liquid flow sensor and determine a calibration factor according to the perceived error between the actual output of the liquid flow sensor, as compared to its expected output over the same volume. Once the correction factor is determined, the flow sensor signals are then appropriately scaled and corrected so that the calculating circuitry receives flow sensor signals which accurately reflect the amount of fluid flowing through the sensor.

It is therefore an object of the present invention to provide method and apparatus for calibrating the output of a fluid flow sensor and to provide an interface between said flow sensor and informational computer devices which provide informational displays to a user.

It is another object of the present invention to provide both method and apparatus whereby fuel flow sensors having dissimilar measuring characteristics may be substituted into an informational system and that system will continue to produce accurate information.

DESCRIPTION OF THE PREFERRED EMBODIMENT

The present invention is applicable to a system which employs a liquid storage tank, having an outlet line connected to a liquid consuming device, a liquid flow sensor in series with that line and a liquid level sensor within the storage tank. The tank, outlet line, flow sensor, consuming device and liquid level sensor are of conventional design and not unique to this invention. The invention, however, increases the accuracy of the measurement information provided by the flow sensor.

Figure 1A:
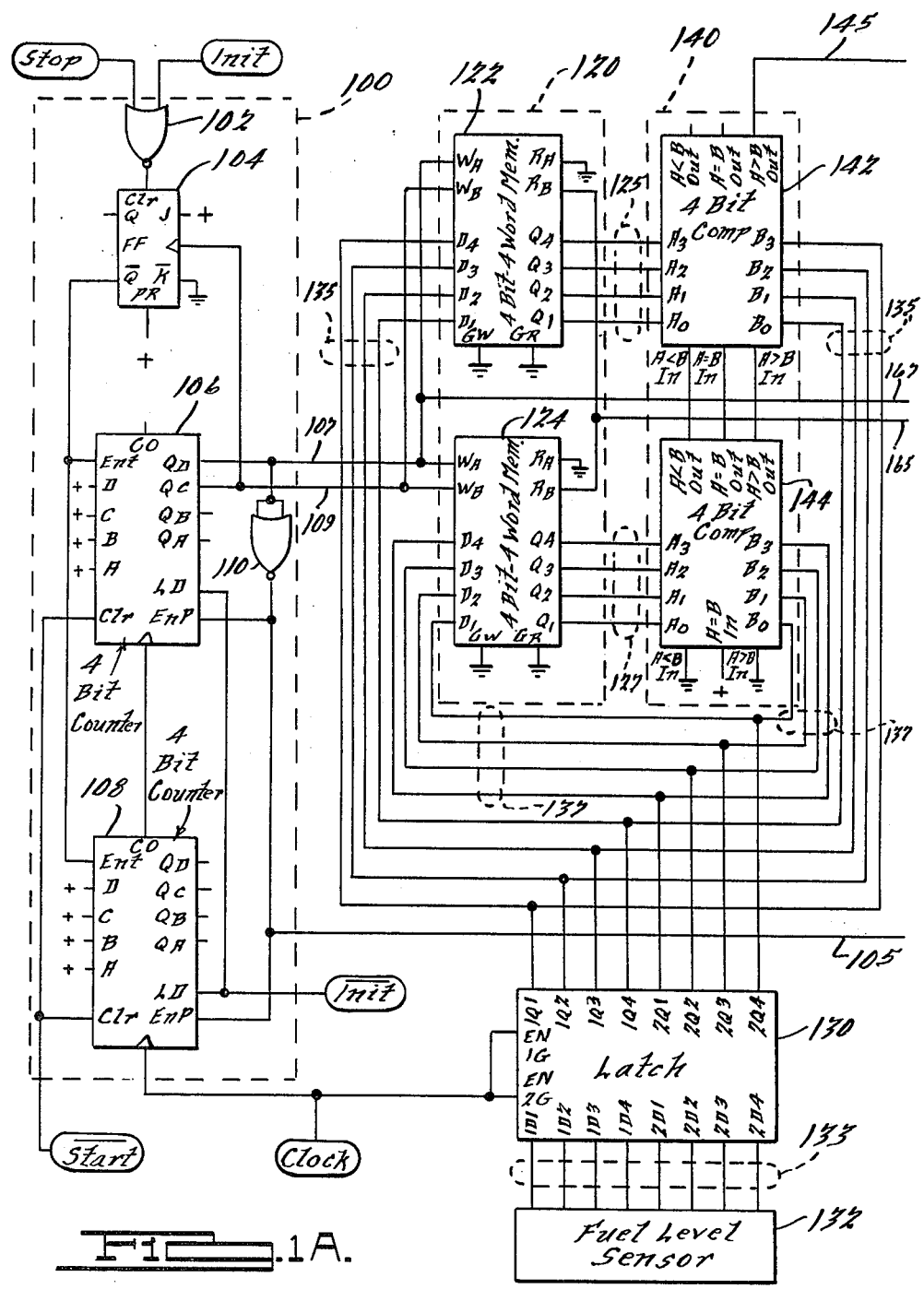
FIGS. 1a and 1b illustrate a detailed wiring diagram of the preferred apparatus embodiment of the present invention.
Figure 1B:
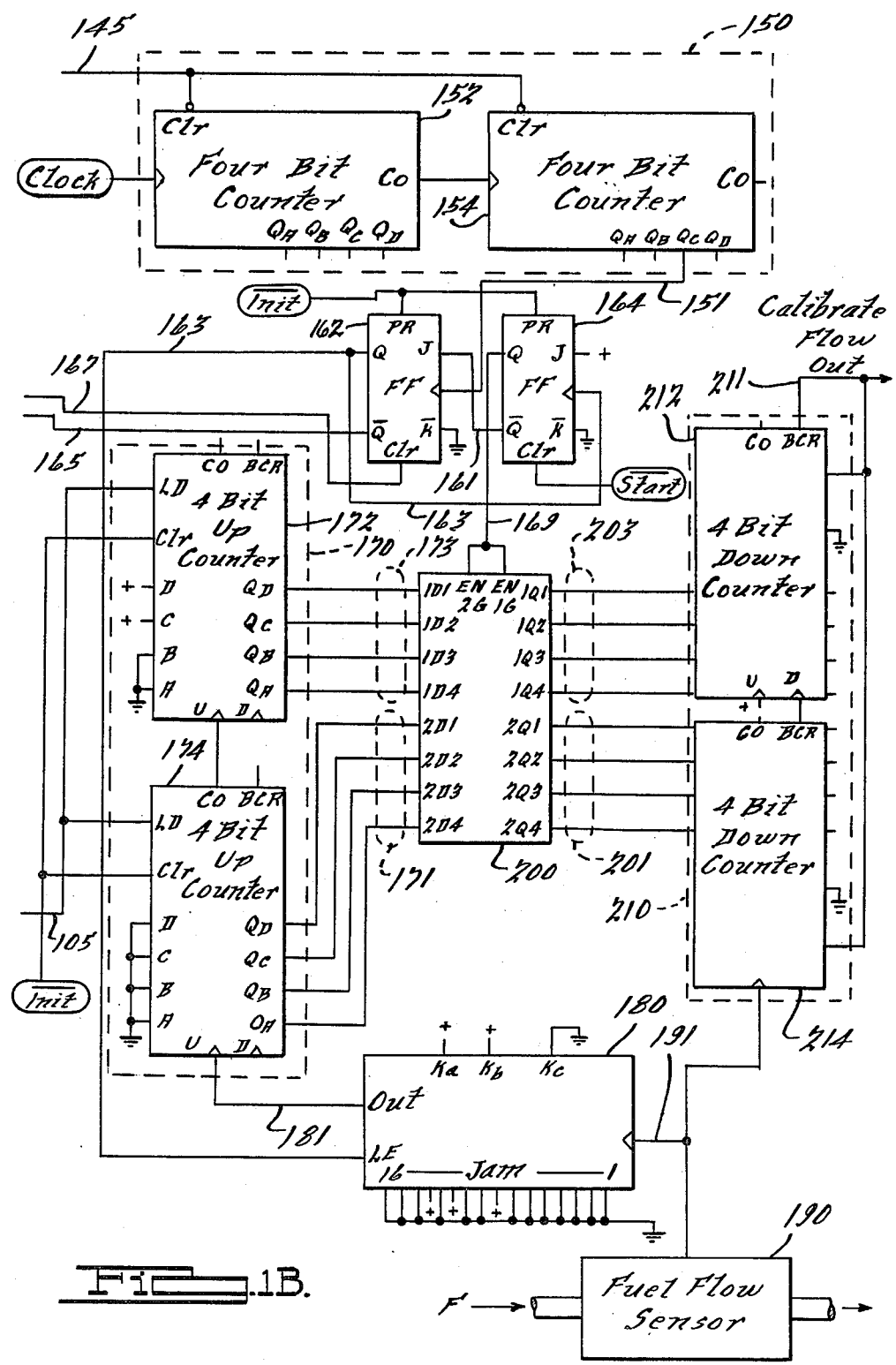

The present invention is implemented in a circuit shown in FIGS. 1a and 1b. The following description is commonly directed to the combination of the two figures as employed in a fuel consuming engine system.

A fuel level sensor 132 is preferably a float type sensor in which a float arm pivots according to the level of the liquid in a storage tank (not shown) and controls a variable resistor at the pivot of the float arm to provide a resistance to an electrical potential in accordance with that level. The electrical potential dropped across the variable resistor is then sensed by an analog to digital converter in a manner as shown in commonly assigned U.S. Patent Application Ser. No. 83,012, filed Oct. 9, 1979 and entitled "Liquid Level Measuring System". This type of sensor is highly accurate in terms of repeatability of signal value for the same liquid levels.

The output of the fuel level sensor 132 is provided as a digital output signal on lines 133 to a latch circuit 130. The latch 130 is enabled to sample the output of the fuel level sensor 132 by clock pulses from a clocking circuit (not shown) and which, in this embodiment, occur at a frequency of approximately 1 Hz. The latch 130 therefore, provides an updated sample output of the level sensor reading for every second of operation.

A first "one minute" (64 second) timer 100 is provided as an initial control to provide a "write" address to a level sensor sampled value storage memory 120.

The counter 100 includes two four bit counters 106 and 108 which are mutually enabled by the least significant digit $Q_D$ output from counter 106 through a NOR gate 110 and a corresponding Q output of a flip flop 104.

The function of the one minute timer 100 is to provide a stabilizing time period for the fuel in the fuel tank when located in a movable vehicle. Under proper operation, the vehicle would initially be placed in a stationary level position with engine operation inhibited. It is assumed that after a one minute time period the fuel in the tank would be stable enough to allow the fuel level sensor 132 to produce an accurate indication of the initial fuel level within the tank.

A START signal is manually applied to the one minute counter 100 to clear both counters 106 and 108, thereby setting the most significant digit output $Q_D$ (as well as the next most significant digit $Q_C$) of counter 106 to a low level. That value is communicated through the NOR gate 110 to thereby enable the counters 106 and 108 to accumulate clock pulses. During that accumulation time period, the write address output on lines 107 and 109 to memory 120 is the two-bit word "00". The value written into that address location is that sampled value present from latch 130, supplied on data line groups 135 and 137. After an accumulation of 64 clock pulses, the next most significant digit output terminal $Q_C$ of counter 106 changes to a high level which forms part of the next write address "01" to memory 120. It is also communicated to the trigger input of flip flop 104 thereby causing it to change state and inhibit counters 106 and 108 from further accumulation. The output of the timer 100 on lines 107 and 109 is then a two-bit word "01", which is the second write address to the memory 120.

Two four-bit word memory units 122 and 124 are connected in parallel so that each receive four data input lines grouped as lines 135 and 137 from the latch 130. The two memory units 122 and 124 together store an eight-bit word in location "00" indicating the initial level of fuel in the storage tank one minute after the START signal has been communicated to the timer 100.

In operation, a predetermined quantity of fuel is then added to the fuel tank. Subsequently a STOP signal is input to the system by a mutual pushbutton of the like. The STOP signal is communicated to a NOR gate 102 of the timer 100 to cause clearing of the flip flop 104 and enable counters 106 and 108 to continue to accumulate pulses from the clock source. Upon accumulation of another 64 clock pulses, the address appearing on lines 107 and 109 is changed to "10". Such an address change causes the last sampled value from the latch 130 to be stored in location "01" of memory 120. Of course that value corresponds to the second level sensed in response to the added quantity of fuel.

When the "1" is present on line 107, both counters 106 and 108 are disabled through NOR gate 110. This output from NOR gate 110 is also considered to be a "valid data entry" signal on line 105 and communicated to the load input of a calibration counter 170. The change on line 107 from a low level to a high level signal also removes a "clear" command on a flip flop 162 communicated thereto by line 167.

Under normal operation, once the second level of fuel within the storage tank is written into the memory, additional fuel may be added to the tank as desired by the operator, without adversely affecting the calibration. In any event, the engine is then operated and consumes fuel "F" fed to the engine through a fuel flow sensor 190 from the storage tank. In the present embodiment, we have selected a turbine type fuel flow sensor, such as that shown in U.S. Pat. No. 3,867,840, which produces output pulses that are related to the rate at which fuel flows through said sensor.

The output signal of the fuel level sensor 132 continues to be sampled by the latch 130 and the value is output therefrom on data line groups 135 and 137.

Only the first two address locations of the memory 120 are used in this embodiment. Therefore, the data present on the inputs of the individual memory units 122 and 124 does not affect the information already stored therein.

The data line groups 135 and 137 are also connected to the "B" inputs of a comparator circuit 140. The comparator circuit 140 also includes a set of "A" inputs which are connected to receive the values read out from the memory 120 on data line groups 125 and 127. The address selection of the appropriate word value being read out from the memory is controlled by the signal on line 165, communicated from the $\overline{Q}$ output of flip flop 162. Line 165 is connected to the read address terminals "$R_B$" of the individual memory units 122 and 124. Accordingly, when the $\overline{Q}$ output of flip flop 162 is at a high level, the second level value in storage is read out as the A inputs to the comparator 140.

The comparator 140 is made up of two four bit comparators 142 and 144 and normally produes a clearing signal to a second "one minute" (64 second) counter 150 on line 145 whenever the currently measured level value from latch 130 at the B inputs is greater than or equal to the second level value present on the A inputs. When the currently measured level value on the B inputs in less than that on the A inputs, the clear signal on line 145 is terminated and the second one minute timer 150 begins to accumulate clock pulses.

The timer 150 comprises two four-bit counters 152 and 154 which are set up in tandem to count clock pulses whenever the clearing signal on lines 145 is removed (i.e. when A is greater than B). Upon the accumulation of 64 counts, the timer 150 produces an output signal on line 151 to a control flip flop 162 which changes the states of its Q and $\overline{Q}$ outputs. The $\overline{Q}$ output of flip flop 162 contains the read address designation to the memory 120 and changes to a low state which commands the memory 120 to read out the word value corresponding to the initial level value on data line groups 125 and 127 to the A input terminals of the comparator 140. At that point, a clear signal is again generated on line 145 until the measured level drops to a value which is less than the initial level value. Therefore, as fuel continues to be consumed from the storage tank, which has a fuel level below the second level and above the initial level, the comparator will see that the measured levels present at the B inputs are greater in value than the value at the A inputs.

The Q output of flip flop 162 is fed on line 163 to provide a clearing signal to a flow sensor signal scaler 180. Prior to receiving a first 64 second count signal from the timer 150 on line 151, the Q output of flip flop 162 provides such a clearing signal. When the first 64 second count output signal on line 151 occurs, the Q output of 162 changes states and enables the scaler 180 to receive pulses on line 191 from the fuel flow sensor 190. The 64 second time period following a measurement corresponding to the second sampled level insures that the level measurement is true and not a spurious signal.

The scaled output of the scaler 180 is fed on line 181 to a set of four-bit up counters 172 and 174 which define the calibration counter 170. The calibration counter 170 continues to accumulate scaled pulses from the fuel flow sensor 190 during the time that the comparator 140 perceives that the measured level of fuel in the storage tank is less than the second stored and value and until the measured level drops to a value which is less than the initially stored value. When the stored comparator 140 perceives the actual measured level value as less than the initially stored level value, the clearing signal on line 145 to the timer 150 is removed and thereby enables the timer 150 to count another 64 clock pulses. If the comparator output on line 145 is uninterrupted for the period of 64 seconds the timer 150 supplies a signal on line 151. That signal on line 151 changes the state of flip flop 162, and provides a clearing signal Q to scaler 180 which inhibits the scaling operation and suspends the supply of pulses on line 181 to the calibration counter 170.

The Q output of flip flop 162 is also fed to the trigger input of a second flip flop 164 which provides a Q output on line 169 that enables a latch 200 during the accumulation period. The latch 200 provides storage of the total accumulated counts of the calibration counter 170 which were received from the fuel flow sensor 190 via scaler 180. The latch 200 is enabled all during the time that the scaler 180 is enabled. However, when the scaler 180 is disabled the Q signal on line 169 disables the latch 200 so that the last value present on data line groups 171 and 173, from the calibration counter 170, is stored and read out therefrom on data line groups 201 and 203.

The value stored in the latch 200 defines a calibration factor that corresponds to the actual number of fuel flow sensor pulses output by the fuel flow sensor 190 while it was measuring the predetermined amount of fuel added to the tank between the START and STOP commands, and subsequently consummed by the engine. Therefore, the value stored in the latch 200 is characteristic of the particular fuel flow sensor used in the system based upon a known volume of liquid that flowed through the sensor.

The latch value is output from the latch 200 on data line groups 201 and 203 to a pair of four-bit down counters 212 and 214 which make up the calibration scaler 210. In this instance, the four bit down counters are loaded with the value present in the latch 200 and provide a single output pulse on line 211 every time a number of pulses from the fuel flow sensor 190 cause the loaded down counters 212 and 214 to reach a 0 accumulation. In this manner, the scaled pulses present on output line 211 are calibrated according to the expected output of an ideal fuel flow sensor at a known rate of pules per gallon.

The INIT signal shown in the drawings is used to initialize the system each time the main power source is reconnected. In a vehicle, this initialization would occur whenever the main battery of the vehicle is connected to the electrical system at its terminals.

In order to illustrate the flexibility of the present invention and its purpose, we submit the following operational scenario.

For example, a type of flow sensor is selected, which, if ideally constructed, is expected to produce 48,000 pulses/gallon. However, after testing several of the constructed sensors, at various temperatures and stages of aging, it is determined that the sensors actually perform within ±20% of the ideal measurement. Therefore, it may be expected that the supplied flow sensors will provide anywhere from 38,000 to 57,600 pulses/gallon. For this example, a desired maximum error is arbitrarily set at 1%.

In a fuel tank of 15-22 gallons capacity, we determine that a 5 gallon volume would be adequate to calibrate the flow sensor and provide the necessary calibration factor. Accordingly, the range of accumulated values for calibration purposes are expected to be between 192,000 and 288,000 pulses/5 gallons at the known error rate.

Therefore, the scaler 180 is selected to accumulate no more than 1,920 pulses (i.e., 192,000×1% maximum error allowed). A divide by "N" counter was selected as scaler 180 and programmed to divide by 1,280 (i.e. 256×5) the most convenient binary total below 1,920.

Using the above presumptions, a fuel flow sensor 190 is installed and the calibration method is commenced.
1. the vehicle is brought to a stop;
2. the engine is inhibited from operation;
3. a START command is given to the calibration system;
4. after approximately one minute, the value corresponding to an initial level of fuel in the fuel tank is stored in memory;
5. five gallons of fuel is added to the fuel tank;
6. a STOP command is given to the calibration systems;
7. after approximately one minute, the value corresponding to the new second value of fuel in the fuel tank is stored in memory;
8. the tank may be filled with additional fuel (optional);
9. the engine is operated;
10. the level of fuel in the tank is continuously measured and that measured value is sampled;
11. the sample level value of fuel in the tank is compared with the second stored level value;
12. when the compared sampled valued is below the second stored level value, a timer is enabled;
13. after approximately one minute without being inhibited by a comparison which indicates the sampled value is not below the second stored level value, the timer enables pulses from the fuel flow sensor to be accumulated;
14. the sampled level value of fuel in the tank is then compared with the initial stored level value;
15. when the compared sampled value is below the initial stored level value, a timer is enabled;
16. after approximately one minute without being inhibited by a comparison which indicates that the sampled value is not below the initial stored level value, the timer inhibits fuel flow sensor pulses from being accumulated;
17. the total accumulated value is stored; and
18. fuel flow sensor pulses are scaled using a factor determined by said accumulated value.

At random, a particular fuel flow sensor was selected for this example and was found to generate 219,400 pulses during the accumulation period, as determined by the comparator 140. Scaler 180, output 171 pulses (i.e., 219,400 divided by 1,280) which were accumulated by the calibration counter 170. That accumulation value of 171 was stored in the latch 200 and loaded into the calibration scaler 210.

The output of the fuel flow sensor 190 is simultaneously fed into the calibration scaler 210 which outputs a calibrated flow output on line 211 on a factored scale of one pulse for every 171 pulses from the fuel flow sensor. That rate is equivalent to a calibrated measuring rate of 256 pulses per gallon.

Of course, for an idealized fuel flow sensor which outputs 48,000 pulses per gallon or 240,000 pulses per 5 gallon calibration measurement, the latch accumulation value would equal 187 (i.e. 240,000 divided by 1,280). Therefore, utilizing the calibration factor of 187, the output of calibration scaler 210 would be equivalent to one pulse for every 187 pulses output from the ideal fuel flow sensor. That rate is equivalent to the 256 calibrated pulses per gallon rate to which the computational circuitry is designated to receive.

The following is a list of parts used in the exemplified embodiment shown in FIGS. 1A and 1B that are commercially available from Texas Instruments Inc. and RCA, as designated.

| Character No. | Part No. |
|---|---|
| 104; 162; 164 | 74109-TI |
| 106; 108; 152; 154 | 74161-TI |
| 122; 124 | 74170-TI |
| 130 | 74100-TI |
| 142; 144 | 74185-TI |
| 172; 174; 212; 214 | 74193-TI |
| 180 | CD4059A-RCA |

It wll be apparent that many modifications and variations may be effected without departing from the scope of the novel concept of this invention. For instance, the exemplified embodiment may be modified from the discrete circuit elements to a single chip or in a microprocessor, as the state of the art dictates for the most economical and reliable implementation. Therefore, it is intended by the appended claims to cover all such modifications and variations which fall within the true spirit and scope of the invention.

We claim:

1. A system for calibrating the reproducible accuracy of an electrical output signal produced by a liquid flow sensor that monitors liquid flowing from a storage tank, wherein said storage tank contains a liquid level sensor which produces an electrical output signal having a value corresponding to the sensed level of said liquid, said system comprising:

means for storing the values of said liquid level electrical output signal at a designated initial level of said liquid in said tank and at a second designated level separated from said initial value by a predetermined volume of liquid added to said tank;

means for accumulating said electrical signal from said liquid flow sensor over a period of time corresponding to the time that said liquid level sensor output signal value corresponds to sensed levels between said designated levels and outputing an accumulation signal when said level sensor output signal value corresponds to said initial level; and means for factoring said electrical signal from said liquid flow sensor by an amount corresponding to said accumulation signal to produce a calibrated flow sensor output signal.

2. A system as in claim 1, wherein said liquid flow sensor produces a pulsed output signal and the occurrence of each pulse is expected to correspond to a predicted quantity of liquid flowing through said flow sensor and the frequency of occurring pulses is expected to vary according to the rate at which liquid is flowing through said flow sensor; and further wherein said accumulating means is a counter circuit enabled to count said pulses from said flow sensor during said period.

3. A system as in claim 1, wherein said electrical output signal produced by said liquid level sensor is a digital signal which is input to said storing means.

4. A method of calibrating the output signal of a liquid flow sensor when employed in a system which utilizes a liquid storage tank having an outlet connected to said liquid flow sensor and a liquid level sensor located in said tank, wherein said liquid level sensor produces an output signal having a value that varies corresponding to a range of sensed levels of said liquid within said storage tank, comprising the steps of:

monitoring the output signal of said liquid level sensor;

storing a first value of said liquid level sensor output signal corresponding to a first level of said liquid within said tank;

adding a predetermined quantity of liquid to said tank to bring said liquid to a second level within said range, greater than said first level;

storing a second value of said liquid level sensor output signal corresponding to said second level of said liquid within said tank;

accumulating a portion of said output signal of said liquid flow sensor over a time period, subsequent of said storing of said second value, defined by the time that said liquid level sensor output signal values corresponding to sensed levels between said second and first levels to produce an accumulated value of said liquid flow sensor output signals corresponding to said predetermined quantity of added liquid flowing through said liquid flow sensor;

storing said accumulated value; and subsequently modifying said output signal from said liquid flow sensor in accordance with said accumulated value, to obtain an ideally scaled output signal that is calibrated according to a volumetric reference.

5. A method as in claim 4, wherein said liquid flow sensor produces a pulsed output signal, wherein the occurrence of each pulse ideally corresponds to a predetermined quantity of liquid forming through said flow sensor, and the frequency of occurring pulses is expected to vary according to the rate at which said liquid is flowing through said flow sensor; and said step of accumulating is performed by counting said pulses from said flow sensor during said time period.

6. A method of calibrating an output signal of a fuel flow sensor, in series between a fuel storage tank and a fuel consumming engine, according to a known volume of fuel comprising the steps of:

inhibiting the operation of said engine;

measuring the level of said fuel in said tank;

subsequently storing said first measured level value;

subsequently adding a predetermined volume of fuel to said tank;

subsequently measuring the level of said fuel in said tank;

subsequently storing said second measured level value;

operating said engine;

continuing to measure the level of said fuel in said tank;

accumulating said fuel flow sensor output signal whenever said continuing level measurements indicate the leve of fuel in said tank to be below said second stored level value and above said first stored level value;

terminating the accumulation step, when said continuing level measurements indicate the level of fuel in said tank has reached said first level value, and producing an accumulation value;

storing and scaling said accumulation value as a calibration factor of the actual output signal from said fuel flow sensor for a predetermined volume of fuel consummed; and factoring said fuel flow sensor output signal with said calibration factor to produce a calibrated output signal from said fuel flow sensor.

7. A method as in claim 6, further including the step of adding more fuel to said tank following said steps of measuring and storing said second level value.

8. A method as in claim 6, further including the step of cancelling any unstored accumulation of said fuel flow output signal whenever said continuing measurement exceeds said stored second level value.

9. A method as in claim 8, further including the step of holding said step of cancelling for a predetermined amount of time and subsequently enabling said accumulation step whenever said continuing level measurements indicate the level of fuel in said tank to be below said stored second level value and above said first stored level value.

* * * * *